United States Patent [19]

Rollmann

[11] Patent Number: 4,460,723

[45] Date of Patent: Jul. 17, 1984

[54] ASPHALT COMPOSITIONS

[75] Inventor: Kent W. Rollmann, Bartlesville, Okla.

[73] Assignee: Phillips Petroleum Company, Bartlesville, Okla.

[21] Appl. No.: 445,308

[22] Filed: Nov. 29, 1982

[51] Int. Cl.³ .............................................. C08L 95/00
[52] U.S. Cl. .................................. 524/70; 106/273 R; 524/59; 524/71; 524/68
[58] Field of Search ............... 106/273 R; 524/59, 70, 524/71, 68

[56] References Cited

U.S. PATENT DOCUMENTS

| | | | |
|---|---|---|---|
| 3,202,623 | 8/1965 | Endres et al. | 260/28.5 |
| 3,243,311 | 3/1966 | Rogers et al. | 106/281 R |
| 3,440,073 | 4/1969 | Fowler et al. | 106/273 R |
| 3,592,794 | 7/1971 | Drake et al. | 260/45.9 |
| 4,158,371 | 6/1979 | Reusser et al. | 138/145 |
| 4,196,115 | 4/1980 | Bresson | 260/28.5 B |
| 4,217,259 | 8/1980 | Bresson | 260/28.5 AS |
| 4,250,067 | 2/1981 | Bresson | 260/28.5 AS |

*Primary Examiner*—Melvyn I. Marquis

[57] ABSTRACT

Stabilization of asphalt and asphalt rubber compositions against degradation, e.g., viscosity increase by addition of a finite small but effective viscosity stabilizing amount of at least one alkali metal salt of an organic or inorganic acid.

18 Claims, No Drawings

ASPHALT COMPOSITIONS

This invention relates to stabilized asphalt compositions. In another aspect, this invention relates to asphalt compositions and asphalt-rubber compositions stabilized against degradation, e.g., viscosity increase, by incorporation of at least one alkali metal salt of an organic or inorganic acid. In another aspect, this invention relates to a method for stabilizing asphalt compositions so as to minimize viscosity increase.

BACKGROUND

Asphalts are of great utility in preparing roofing materials and the like for use in the construction and housing industries. They also find widespread use in paving materials for highways, parking lots, airports, and the like.

In many of the above applications it is often desirable to add rubbery polymers (elastomers) to the asphalt compositions. This practice, which has been known for many years, is generally done to broaden the useful temperature range of said asphalt composition by improving the ductility at low temperatures and improving the resistance to flow at elevated temperatures. It is further known that thermoplastic elastomeric block polymers of conjugated dienes and vinyl aromatic compounds are especially useful for the purposes noted above as disclosed in U.S. Pat. No. 4,196,115.

In the preparation and/or application of essentially all of the asphalt containing materials noted above, whether or not an elastomer is added, it is necessary to heat the asphalt to provide a fluid or flowable state at some point in the process. In some applications it is necessary to maintain the asphalt or asphalt-containing material at this heated fluid state for extended periods of time. In the case of paving applications, unavoidable delays due to bad weather or other factors may require the asphalt to be kept at the heated fluid state for several days. Furthermore, when an elastomer is added to the asphalt it is common practice to use heat and high shear mixing conditions to provide a good dispersion of the rubber in the asphalt and the resulting composition may have to be kept stirred while hot for extended periods of time. A serious problem has been found to occur with certain asphalts when these asphalts are subjected to the extended heating conditions described above. Said asphalts or materials containing said asphalts often undergo a sudden rapid increase in viscosity which may render them completely useless or at least greatly increase the difficulty in handling them for further use. The presence of elastomers in these asphalts seems to aggravate the problem described above. Furthermore, it has not been practical to define the limits of time and temperature through which each of these asphalts may be safely held before the onset of rapid viscosity increase. In addition, it does not appear possible at the present time to clearly identify those asphalts which will be susceptible to the problem of sudden viscosity increase without actually subjecting a sample of the asphalt or asphalt-containing composition to prolonged heating preferably under mild agitation.

It is clear that a solution to the problem of sudden viscosity increase for those asphalts which exhibit this behavior would be welcome.

The instant invention provides certain additives which minimize or eliminate the viscosity increase for the neat asphalts which are susceptible. Within the group of said additives are other additives which minimize or eliminate the viscosity increase for the susceptible asphalts which also contain elastomers.

OBJECTS OF THE INVENTION

Accordingly the object of this invention is to provide stabilized asphalt compositions.

Another object of this invention is to provide additives for stabilizing asphalt compositions against degradation.

A further object of this invention is to provide additives for stabilizing asphalt/rubber compositions against viscosity increases when exposed to elevated temperatures.

Another object of this invention is to provide a method for stabilizing asphalt compositions and asphalt/rubber compositions against degradation, e.g., viscosity increase.

Other objects, aspects, as well as several advantages of the invention will be apparent to those skilled in the art upon studying the disclosure and the appended claims.

SUMMARY OF THE INVENTION

According to the invention asphalt compositions susceptible to viscosity increases when exposed to elevated temperatures are stabilized against degradation, e.g., viscosity increase, by incorporation of a finite small stabilizing amount of at least one alkali metal salt of an organic or inorganic acid.

In accordance with one specific embodiment of the invention, alkali metal salts of organic and inorganic acids have been found to reduce or eliminate the sudden viscosity increase of neat asphalts which are susceptible to this problem.

Further, according to the invention, lithium, sodium and potassium salts of organic and inorganic acids can be used to reduce or eliminate the sudden viscosity increase of those asphalts which also contain elastomers that are susceptible to this problem.

In accordance with another embodiment of the invention, a process is provided for the stabilization of asphalt compositions and asphalt rubber compositions susceptible to viscosity increases when exposed to elevated temperatures by incorporation of a small effective finite stabilizing amount of at least one alkali metal salt of an organic or inorganic acid.

DETAILED DESCRIPTION OF INVENTION

Scope of Asphalts

This invention is applicable to any asphalt or rubber-containing asphalt which exhibits the characteristic described above as rapid viscosity increase on being heated over a prolonged period of time under mild agitation. Typical test conditions which could be employed for testing a particular asphalt or rubber-containing asphalt include: about 175° C., about 48 hours, at about 180 rpm with a paddle type stirrer. For very soft asphalts temperatures as low as 125° C. could be used and for the very hard asphalts up to 225° C. could be used for the test temperature. Depending on the sensitivity of the asphalt, the test duration could be shortened or lengthened as desired. Agitation can also be varied over a wide range as desired. Viscosities can be measured with a Brookfield Viscometer or similar suitable instrument.

It has been observed that a plot of viscosity vs. time for a susceptible asphalt or rubber-containing asphalt generally gives an "S" shaped curve wherein there is an initial rather rapid increase in viscosity, say during the first few hours, followed by a slow gradual increase (plateau) and then a second rapid increase in viscosity appears again. It should be made clear that this invention deals with minimizing or eliminating the second period of rapid viscosity increase which is so disastrous to asphalt handling operations.

SCOPE OF ELASTOMERS

As noted above the problem of rapid viscosity increase on prolonged heating of those susceptible asphalts seems to be aggravated when elastomers are added to said asphalts. But, as also noted these rubberized asphalts have very useful properties in many applications. Any rubbery polymer (elastomer) conventionally employed in asphalt compositions can be used in making asphalt compositions to be treated according to this invention. Examples of suitable rubbery polymers include polybutadiene, polyisoprene, natural rubber, butadiene/styrene random copolymer (emulsion polymerized SBR or solution polymerized), ethylene/propylene/diene monomer terpolymer (EPDM), isobutylene/isoprene copolymer (butyl rubber), butadiene/styrene block copolymer, isoprene/styrene block copolymer and the like. Mixtures of two or more suitable elastomers can be employed if so desired.

When an elastomer is employed in the asphalt composition it can be present at a concentration of about 1 to about 30, preferably 5–20 wt. % based on the total asphalt composition.

Conventional mixing procedures and equipment can be employed for mixing the elastomer with the asphalt such as stirring particles, crumbs, or chunks of the elastomer into heated asphalt at a temperature within the range of about 140° C. to about 235° C. for a time sufficient to achieve a good dispersion of the rubber in the asphalt.

IV. SCOPE OF ADDITIVES

The additives of this invention are broadly described as alkali metal salts of organic and inorganic acids but with narrowing scope as one proceeds from lithium to cesium with the group of alkali metals. Compounds such as the hydroxides and sulfides do not appear to be suitable additives according to this invention. Furthermore, salts of rubidium and cesium do not appear to be effective when an elastomer is present in the asphalt. In addition, some potassium salts i.e. potassium acetate, show selectivity in terms of the asphalt employed.

With the above comments in mind, suitable (A) lithium and sodium salts include the salts of: (1) aliphatic carboxylic acids having from 1–20 carbon atoms per molecule, (2) aromatic carboxylic acids having from 7–20 carbon atoms per molecule, (3) cycloaliphatic acids having from 4–20 carbon atoms per molecule, (4) hydroxy substituted polycarboxylic acids having from 4–20 carbon atoms per molecule, (5) aromatic sulfonic acids having from 6–20 carbon atoms per molecule, (6) nitric acid and (7) hydrogen halide acids. Suitable (B) potassium, rubidium, and cesium salts include the salts of groups (1) and (4) above. As noted above, salts of rubidium and cesium do not appear to be effective according to this invention when an elastomer is present in the asphalt.

Examples of suitable compounds in (A), (1) include lithium formate, lithium acetate, lithium butanoate, lithium octanoate, lithium hexadecanoate, lithium octadecanoate, sodium formate, sodium acetate, sodium pentanoate, sodium decanoate, sodium dodecanoate, sodium octadecanoate, in (A), (2)-lithium benzoate, lithium 4-methylbenzoate, dilithium o-phthalate, lithium 1-naphthalenecarboxylate, lithium 2,4,5-tributylbenzoate, sodium 9-hexyl-1-anthracenecarboxylate, sodium benzoate, sodium 2,6-dimethylbenzoate, disodium terephthalate, sodium 2-naphthalenecarboxylate; sodium 9-anthracenecarboxylate; in (A), (3)-lithium cyclobutane carboxylate, lithium cyclooctanecarboxylate, lithium cyclododecanecarboxylate, sodium naphthenate, sodium cyclopentanecarboxylate, sodium cyclohexanecarboxylate, disodium 4,8-dipentylcyclooctane-1,2-dicarboxylate; in (A), (4)-dilithium tartronate, dilithium malate, dilithium tartrate, dilithium 2,3,4,5-tetrahydroxyhexane-1,6-dioate, disodium tartronate, disodium malate, disodium tartrate, disodium 2,3,4,5-tetrahydroxyhexane-1,6-dioate, trilithium citrate, trisodium citrate; in (A), (5)-lithium benzenesulfonate, lithium p-toluenesulfonate, lithium p-hexylbenzenesulfonate, lithium p-tetradecylbenzenesulfonate, sodium 2,6-dimethylbenzenesulfonate, sodium p-dodecylbenzenesulfonate, disodium 2,6-naphthalenedisulfonate, disodium 1,5-anthraquinonedisulfonate; in (A), (6)-lithium nitrate, sodium nitrate; in (A), (7) lithium chloride, lithium bromide, lithium iodide, sodium fluoride, sodium chloride, sodium bromide, and sodium iodide. Mixtures of these compounds can be used, if desired.

Examples of suitable compounds in (B), (1) include potassium formate, potassium acetate, potassium hexanoate, potassium dodecanoate, potassium octadecanoate, rubidium acetate, rubidium octanoate, rubidium dodecanate, cesium acetate, cesium heptanoate, cesium dodecanoate, cesium octadecanoate, in (B), (4) dipotassium malate, dipotassium tartrate, tripotassium citrate, dirubidium tartronate, dirubidium tartrate, dicesium malate, dicesium 2,3,4,5-tetrahydroxyhexane-1,6-dioate, and tricesium citrate. Mixtures of these compounds and mixtures of these compounds with compounds of (A)(1) and (A)(4) can also be used, if desired.

The amount of additive employed will be broadly in the range of from about 0.05–2, preferably from about 0.2–0.8, wt. percent based on the weight of the total asphalt composition (including elastomer if added).

The alkali metal salt additive of this invention can be admixed with the asphalt in any convenient fashion. For example, the alkali metal salt can be added just after the asphalt becomes fluid or molten under heat and stirring. It can be added just before the elastomer, if any, is added to the asphalt. It is also possible to premix the elastomer and a suitable alkali metal salt and then add this premix to the asphalt. In any case it is obviously desired that the alkali metal salt be present in the asphalt before the asphalt or asphalt-elastomer is subjected to an extended period of heat and stirring.

EXAMPLE 1

Samples of asphalt C with and without rubber were examined for viscosity behavior on prolonged heating and stirring in the presence and absence of additives.

Asphalt C was obtained from a Venezuelan crude oil and had the following properties: 181 pen (ASTM-D5-71), 47° C. $T_{r+b}$ (ASTM-D36-76), and 26.7% asphaltenes (n-pentane insolubles at room temperature). The rubber employed was a branched (radial) block copolymer of butadiene/styrene (70/30 weight ratio) wherein the terminal portions of the branches are polystyrene blocks and wherein the number average molecular weight is about 220,000. This rubber is of the thermoplastic elastomer type.

Each run was made by stirring the asphalt (50 g) in a 400 mL stainless steel beaker at 177° C. until molten then charging the additive (0.5% by weight based on the total asphalt composition), if employed. After thorough mixing the rubber was added, if employed. Stirring was maintained at 184 rpm with a stainless steel paddle type stirrer. At 1.5 hours and/or after 48 hours stirring vicosity measurements were made with a thermostated type RVT-E Brookfield Viscometer. The results obtained in these runs are shown in Table I.

TABLE I

| Run No. | Additive Compound | Viscosity, cps | Time, hr. |
|---|---|---|---|
| 1 | none | 7,550 | 1.5 |
| 2 | none | 14,700 | 8 |
| 3 | none | 41,200 | 48 |
| 4 | lithium acetate | 11,500 | 48 |
| 5 | lithium stearate | 13,700 | 48 |
| 6 | sodium acetate | 20,250 | 48 |
| 7 | sodium stearate | 15,800 | 48 |
| 8 | sodium benzoate | 12,130 | 48 |
| 9 | sodium naphthenate | 25,800 | 48 |
| 10 | disodium tartrate.2H$_2$O$^a$ | 5,880 | 48 |
| 11 | disodium 2,6-napthalenedisulfonate | 30,200 | 48 |
| 12 | disodium anthraquinone-1,5-disulfonate | 16,300 | 48 |
| 13 | sodium nitrate | 19,450 | 48 |
| 14 | sodium chloride | 22,250 | 48 |
| 15 | sodium bromide | 25,900 | 48 |
| 16 | potassium acetate | 170,000 | 48 |
| 17 | dipotassium tartrate.½H$_2$O$^a$ | 13,550 | 48 |
| 18 | potassium bromide | —$^b$ | 48 |
| 19 | sodium sulfide.9H$_2$O$^a$ | —$^c$ | 48 |
| 20 | potassium hydroxide | —$^b$ | 48 |
| 21 | rubidium acetate$^d$ | 116,000 | 48 |
| 22 | cesium acetate$^e$ | 191,500 | 48 |

$^a$Amount added was based on the anhydrous salt.
$^b$Too viscous to measure.
$^c$Mixture appeared to cure (crosslink).
$^d$Employed 0.9 wt. % of additive.
$^e$Employed 1.2 wt. % of additive.

The above results show that with the exception of sodium sulfide all of the lithium and sodium salts were effective in reducing the viscosity increase of the asphalt compositions when compared to the control runs (Runs 1-3). However, with this asphalt C, potassium acetate, rubidium acetate, cesium acetate, potassium bromide and potassium hydroxide were not effective in reducing the viscosity increase and actually promoted a viscosity increase compared to the control runs.

The result in Run 19 shows that sulfide compounds should be avoided when seeking to minimize the viscosity incease for the susceptible asphalt compositions.

EXAMPLE 2

Other runs were conducted which examined the effectiveness of alkali metal acetates on reducing the viscosity on prolonged heating/stirring of asphalt D which had the following properties: 73 pen, 54° C. T$_{r+b}$ and 20.7 wt. % asphaltenes. Asphalt D was obtained from Arkansas crude oil, Smackover field. Runs were made with and without the elastomer previously described. In all these runs the stirrer rpm was 500, the temperature was 177° C. and the time of viscosity measurement was 48 hours. Runs 1-6 used 70 g asphalt samples while Runs 7-12 used 80 g asphalt samples. The results are shown in Table II below.

TABLE II

| Run No. | Elastomer wt. % | Additive Acetate Compound | Wt. %$^a$ | Viscosity, cps |
|---|---|---|---|---|
| 1 | 14 | none | — | 26,700 |
| 2 | 14 | lithium | 0.51 | 16,150 |
| 3 | 14 | sodium | 0.67 | 19,350 |
| 4 | 14 | potassium | 0.80 | 19,100 |
| 5 | 14 | rubidium | 1.18 | 87,500 |
| 6 | 14 | cesium | 1.54 | —$^b$ |
| 7 | 0 | none | — | 4,240 |
| 8 | 0 | lithium | 0.51 | 534 |
| 9 | 0 | sodium | 0.67 | 608 |
| 10 | 0 | potassium | 0.80 | 2,760 |
| 11 | 0 | rubidium | 1.17 | 557 |
| 12 | 0 | cesium | 1.54 | 406 |

$^a$The values shown for wt. % represent the same mole % level, 0.008.
$^b$Too high to measure.

The results shown in Table II show that with neat asphalt D all of the alkali metal acetates were effective in reducing the viscosity at 48 hr. compared to the control Run 7. However, when the elastomer was present only the lithium, sodium and potassium acetates were effective in reducing the viscosity of the asphalt D-elastomer composition.

EXAMPLE 3

Other runs were conducted which examined the effect of sodium tartrate as an additive in different asphalts with and without the elastomer previously used in earlier examples. Asphalt C has been described in Example I while Asphalt D is described in Example II above. Asphalt A was obtained from California North Slope crude oils and had the following properties: 216 pen, 43° C. T$_{r+b}$, 17.6% asphaltenes (n-pentane insolubles at room temperature). Asphalt E was obtained from a Kansas crude oil and had the following properties: 82 pen, 53° C. T$_{r+b}$, and 22.7% asphaltenes. These runs used 50 g samples of asphalt and a 184 rpm stirring rate at 177° C. The results obtained are presented in Table III.

TABLE III

| Run No. | Asphalt | Sodium tartrate, wt. % | Elastomer, Wt. % | Time, Hr. | Viscosity, cps |
|---|---|---|---|---|---|
| 1 | A | 0 | 0 | 48 | 106 |
| 2 | A | 0.5 | 0 | 48 | 87 |
| 3 | A | 0 | 14 | 1.5 | 5,040 |
| 4 | A | 0 | 14 | 48 | 2,365 |
| 6 | E | 0 | 14 | 1.5 | 5,800$^a$ |
| 7 | E | 0 | 14 | 48 | 5,920 |
| 8 | E | 0.5 | 14 | 48 | 8,700 |
| 9 | D | 0 | 14 | 1.5 | 3,190$^a$ |
| 10 | D | 0 | 14 | 48 | 21,150 |
| 11 | D | 0.5 | 14 | 48 | 12,350 |
| 12 | C | 0 | 0 | 48 | 255 |
| 13 | C | 0.5 | 0 | 48 | 171 |
| 14 | C | 0 | 14 | 1.5 | 7,550 |
| 14 | C | 0 | 14 | 48 | 41,200 |
| 16 | C | 0.5 | 14 | 2.5 | 7,600 |
| 17 | C | 0.5 | 14 | 48 | 5,880 |

$^a$Elastomer was not completely dissolved at 1.5 hours.

The results from Runs 3, 4, 6 and 7 indicate that asphalts A and E are not susceptible to the problem of viscosity increase. In compositions containing these asphalts sodium tartrate had no beneficial effect on viscosity of the compositions. However, asphalts C and D are susceptible to the viscosity increase problem and sodium tartrate does show a beneficial effect on reducing the viscosity increase.

Physical properties of the asphalt compositions of Runs 14, 15 and 17 were measured to observe the effect of sodium tartrate thereon. These results are shown in Table IV below.

TABLE IV

| Run No. | Ring & Ball T, °C. | 75° Inclined[a] Plane Flow, mm | Mandrel[b] Bend, °C. | Modulus[c] KPa | Recovery[d] % |
|---|---|---|---|---|---|
| 14 | 134 | 30 | −15 | 31 | 88 |
| 15 | 167 | 0 | −15 | 40 | 75 |
| 17 | 119 | 20 | −10 | 27 | 76 |

[a]Distance in mm moved by 40 × 60 × 3 mm cast sample on white posterboard at 100° C. in 5 hours.
[b]Test made by bending 3 mm thick sample, preconditioned at the test temperature, over a ⅜inch diameter mandrel. Temperature is reduced in 5° increments and test repeated until sample breaks. This is the temperature shown in the Table.
[c]Relaxation modulus determined with Model TM Instron tensile tester machine after releaxing 30 min. at 300% elongation at room temperature.
[d]Measured linear recovery of sample after 60 minutes.

The results shown in Table IV indicate that sodium tartrate had no significant deleterious effect on the physical properties of the asphalt composition to which it was added.

EXAMPLE 4

Other runs were made which examined the effect of different levels of sodium tartrate on the viscosity of asphalt C containing 14 wt. % of the elastomer previously employed. These runs used 50 g asphalt samples at 184 rpm stirring rate and at 177° C. Measurements were made after 48 hours of heating/stirring. The results are presented in Table V.

TABLE V

| Run No. | Na Tartrate wt. % | Viscosity, cps |
|---|---|---|
| 1 | 0 | 41,200 |
| 2 | 0.17 | 19,850 |
| 3 | 0.5 | 5,880 |
| 4 | 0.83 | 17,850 |

The results in Table V would indicate that maximum viscosity reducing effectiveness of the additive sodium tartrate in asphalt C is at about 0.5 wt. %.

EXAMPLE 5

Additional runs were made using 50 gram samples of asphalt C containing 14 t. % of the elastomer previously employed and various combinations of known antioxidant compounds with and without sodium tartrate, an additive of this invention. Runs were made at 184 rpm stirring rate and at 177° C. Viscosity measurements were made at 48 hours. The results obtained in this series of runs are presented in Table VI below.

TABLE VI

| Run No. | Na Tartrate, wt. % | Antioxidant Type | Wt. % | Viscosity, cps |
|---|---|---|---|---|
| 1 | 0 | — | — | 41,200 |
| 2 | 0.5 | — | — | 5,880 |
| 3 | 0 | P[b] | 2 | —[a] |
| 4 | 0.5 | P[b] | 1 | —[a] |
| 5 | 0 | R[c] | 0.3 | 19,250 |
| 6 | 0.5 | R[c] | 0.3 | 25,050 |
| 7 | 0 | R[c] | 0.2 | 27,700 |
|   |   | N[d] | 0.07 |   |
| 8 | 0.5 | R[c] | 0.2 | 37,900 |
|   |   | N[d] | 0.07 |   |
| 9 | 0 | R[c] | 0.2 | 23,100 |
|   |   | Z[e] | 0.07 |   |
| 10 | 0.5 | R[c] | 0.2 | —[a] |
|   |   | Z[e] | 0.07 |   |

[a]Too viscous to measure.
[b]P = phenothiazine.
[c]R = trisnonylphenyl phosphite.
[d]N = phosphite-phenolic blend from Uniroyal.
[e]Z = zinc dibutyldithiocarbamate.

The results in Table VI show that while some of the antioxidants did show a viscosity decrease compared to the control run they were not nearly as effective as sodium tartrate. Furthermore, the use of mixtures of sodium tartrate with these antioxidants indicated they were antagonistic to each other in terms of the viscosity reduction.

I claim:

1. An asphalt composition stabilized against viscosity increases at elevated temperatures comprising asphalts substantially free of rubber, susceptible to viscosity increase and a finite small but effective viscosity stabilizing amount of at least one of
    (a) alkali metal salts of aliphatic carboxylic acids having from 1–20 carbon atoms per molecule
    (b) lithium and sodium salts of aromatic carboxylic acids having from 7–20 carbon atoms per molecule
    (c) lithium and sodium salts of cycloaliphatic carboxylic acids having from 4–20 carbon atoms per molecule
    (d) lithium and sodium salts of aromatic sulfonic acids having from 6–20 carbon atoms per molecule and
    (e) lithium and sodium salts of nitric acid.

2. An asphalt composition stabilized against viscosity increases at elevated temperatures comprising asphalts, substantially free of rubber, susceptible to viscosity increase and at least one of
    (a) alkali metal salts of aliphatic carboxylic acids having from 1–20 carbon atoms per molecule
    (b) lithium and sodium salts of aromatic carboxylic acids having from 7–20 carbon atoms per molecule
    (c) lithium and sodium salts of cycloaliphatic carboxylic acids having from 4–20 carbon atoms per molecule
    (d) lithium and sodium salts of aromatic sulfonic acids having from 6–20 carbon atoms per molecule and
    (e) lithium and sodium salts of nitric acid, wherein the amount of said salt present ranges from about 0.05 to about 2 weight percent based on the total weight of the composition.

3. A composition according to claim 1 wherein said salts are alkali metal acetates.

4. A composition according to claim 2 wherein said salts is present in amounts ranging from about 0.2 to about 0.8 weight percent.

5. A process for stabilizing the viscosity of asphalt comprising incorporating into an asphalt, substantially free of rubber, susceptible to viscosity increase when exposed to elevated temperatures a finite small but effective stabilizing amount of at least one of
    (a) alkali metal salts of aliphatic carboxylic acids having from 1–20 carbon atoms per molecule
    (b) lithium and sodium salts of aromatic carboxylic acids having from 7–20 carbon atoms per molecule (c) lithium and sodium salts of cycloaliphatic carboxylic acids having from 4–20 carbon atoms per molecule
(d) lithium and sodium salts of aromatic sulfonic acids having from 6–20 carbon atoms per molecule and
(e) lithium and sodium salts of nitric acid,
(f) lithium and sodium salts of hydrogen halide acids.

6. A process according to claim 5 wherein said stabilizing amount ranges from about 0.05 to about 2 weight percent based on the total weight of the composition.

7. A process according to claim 5 wherein said salt is an alkali metal acetate.

8. A process according to claim 5 wherein said salt is an alkali metal salt of hydroxy substituted polycarboxylic acids having from 4 to 20 carbon atoms per molecule and is present in amounts ranging from about 0.2 to about 0.8 weight percent based on the total weight of the composition.

9. A process according to claim 8 wherein said salt is sodium tartrate.

10. An asphalt composition stabilized against viscosity increases at elevated temperatures comprising asphalts susceptible to viscosity increase and a finite small but effective viscosity stabilizing amount of at least one of
(a) lithium, sodium, and potassium salts of aliphatic carboxylic acids having from 1–20 carbon atoms per molecule,
(b) lithium and sodium salts of aromatic carboxylic acids having from 7–20 carbon atoms per molecule,
(c) lithium and sodium salts of cycloaliphatic acids having from 4–20 carbon atoms per molecule,
(d) lithium and sodium salts of aromatic sulfonic acids having from 6–20 carbon atoms per molecule, and
(e) lithium and sodium salts of nitric acid and wherein the composition additionally contains a rubbery polymer.

11. A composition according to claim 10 wherein the amount of rubber present in said composition ranges from about 1–30 weight percent based on the total weight of said composition.

12. A composition according to claim 10 wherein the amount of said salt present ranges from about 0.05 to about 2 weight percent based on the total weight of the composition.

13. A composition according to claim 10 wherein said rubbery polymer is a butadiene/styrene block copolymer.

14. A composition according to claim 10 wherein said salts are lithium, sodium or potassium acetates and said rubber is a butadiene/styrene block copolymer.

15. A composition according to claim 10 wherein said alkali metal salt is sodium tartrate.

16. A process for stabilizing the viscosity of asphalts comprising incorporating into an asphalt susceptible to viscosity increase when exposed to elevated temperatures a finite small but effective stabilizing amount of at least one of
(a) lithium, sodium, and potassium salts of aliphatic carboxylic acids having from 1–20 carbon atoms per molecule,
(b) lithium and sodium salts of aromatic carboxylic acids having from 7–20 carbon atoms per molecule,
(c) lithium and sodium salts of cycloaliphatic acids having from 4–20 carbon atoms per molecule,
(d) lithium and sodium salts of aromatic sulfonic acids having from 6–20 carbon atoms per molecule,
(e) lithium and sodium salts of nitric acid
(f) lithium and sodium salts of hydrogen halide acids wherein said asphalt further contains from about 1–30 weight percent based on the total weight of the composition a rubbery polymer.

17. A process according to claim 16 wherein said salt is lithium sodium or potassium acetate.

18. A process according to claim 16 wherein said stabilizing amount ranges from about 0.05 to about 2 weight percent based on the total weight of the composition.

* * * * *